(12) United States Patent
Hwang et al.

(10) Patent No.: US 11,347,473 B2
(45) Date of Patent: May 31, 2022

(54) DISPLAY DEVICE

(71) Applicant: LG ELECTRONICS INC., Seoul (KR)

(72) Inventors: Sunho Hwang, Seoul (KR); Kyoungryul Lim, Seoul (KR); Ingyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/013,433

(22) Filed: Sep. 4, 2020

(65) Prior Publication Data
US 2021/0373844 A1    Dec. 2, 2021

(30) Foreign Application Priority Data
May 26, 2020   (KR) .......................... 10-2020-0062903

(51) Int. Cl.
*G06F 3/16*    (2006.01)
*H04R 3/02*    (2006.01)

(52) U.S. Cl.
CPC .............. *G06F 3/165* (2013.01); *G06F 3/167* (2013.01); *H04R 3/02* (2013.01); *H04R 2420/07* (2013.01); *H04R 2499/15* (2013.01)

(58) Field of Classification Search
CPC .......... G06F 3/165; G06F 3/167; H04R 3/02; H04R 2420/07; H04R 2499/15
See application file for complete search history.

(56) References Cited

U.S. PATENT DOCUMENTS

| | | |
|---|---|---|
| 9,659,555 B1 | 5/2017 | Hilmes et al. |
| 10,148,823 B2 | 12/2018 | Jang et al. |
| 10,586,534 B1 | 3/2020 | Argyropoulos et al. |
| 10,595,426 B2 | 3/2020 | Ryu |
| 2013/0266158 A1* | 10/2013 | Elkhatib .................. H04R 3/12 381/120 |
| 2014/0139615 A1* | 5/2014 | Graham ................. H04R 3/005 348/14.08 |
| 2016/0182998 A1 | 6/2016 | Galal et al. |

(Continued)

FOREIGN PATENT DOCUMENTS

| | | |
|---|---|---|
| KR | 101280964 | 7/2013 |
| KR | 1020160112804 | 9/2016 |

(Continued)

OTHER PUBLICATIONS

Korean Intellectual Property Office Application No. 10-2020-0062903, Office Action dated Mar. 12, 2021, 5 pages.

(Continued)

*Primary Examiner* — Joseph Saunders, Jr.
(74) *Attorney, Agent, or Firm* — Lee Hong Degerman Kang & Waimey

(57) ABSTRACT

A detachable display device includes a main box including a microphone and a main processor, and a display including an amplifier configured to amplify an audio signal received from the main processor and a speaker configured to convert the amplified audio signal into a sound and output the sound. The main processor is configured to perform acoustic echo cancellation (AEC) on the audio signal based on the audio signal output by the main processor, equalization information, and volume information.

13 Claims, 10 Drawing Sheets

(56) References Cited

U.S. PATENT DOCUMENTS

2018/0012581 A1\* 1/2018 Liang .................... G10H 1/361
2019/0259408 A1   8/2019 Freeman et al.
2020/0202881 A1\* 6/2020 Lee ...................... H04M 9/082

FOREIGN PATENT DOCUMENTS

KR   1020180067143    6/2018
KR   1020200055365    5/2020

OTHER PUBLICATIONS

European Patent Office Application Serial No. 20205433.4, Search Report dated Apr. 7, 2021, 10 pages.

\* cited by examiner

FIG. 2
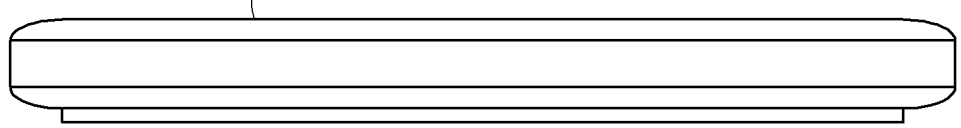

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0062903, filed on May 26, 2020, the contents of which are hereby incorporated by reference herein in its entirety.

BACKGROUND

The present disclosure relates to a display device, and more particularly, to a detachable display device in which a display and a main box for controlling the display are separated.

Digital TV services using wired or wireless communication networks are becoming common. Digital TV service can provide various services that could not be provided in existing analog broadcast services.

For example, an Internet Protocol Television (IPTV) or a smart TV service, which is one of the digital TV services, provides a bidirectional service that allows a user to actively select a type of a program to be watched, a watching time, and the like. The IPTV or the smart TV service may provide various additional services based on the bidirectionality, for example, Internet browsing, home shopping, online games, and the like.

In addition, in the conventional TV, a main System on Chip (SoC) and an amplifier for audio output are on the same board. Thus, there is no problem in the processing of acoustic echo cancellation (hereinafter referred to as AEC) through the audio output of the amplifier.

However, recently, new display devices employ detachable display devices in which an amplifier for audio output and a main SoC are separated.

In the case of the detachable display devices, when the main SoC receives an audio signal output from the amplifier as a feedback signal, the AEC may not be normally processed due to a delay until the feedback signal is transmitted.

SUMMARY

The present disclosure aims to provide a detachable display device capable of efficiently performing acoustic echo cancellation (AEC).

The present disclosure aims to provide a display device capable of improving the performance of remote speech recognition.

According to one embodiment of the present disclosure, a display device includes a main box including a microphone and a main processor, and a display including an amplifier configured to amplify an audio signal received from the main processor and a speaker configured to convert the amplified audio signal into a sound and output the sound, wherein the main processor is configured to perform acoustic echo cancellation (AEC) on the audio signal based on the audio signal output by the main processor, equalization information, and volume information.

The equalization information may include a degree of amplification or a degree of attenuation for a specific frequency band of the audio signal, and the volume information may include a degree of amplification for a magnitude of the audio signal.

The equalization information and the volume information may be information about the amplifier, and the main processor may be configured to store the equalization information and the volume information in advance.

The main processor may be configured to amplify or attenuate the specific frequency band of the audio signal by using the equalization information, and adjust the magnitude of the audio signal by using the volume information.

The main processor may be configured to duplicate the audio signal, of which the specific frequency band is adjusted and the magnitude is adjusted, and remove an input audio signal when the duplicated audio signal is identical to the input audio signal input through the microphone.

The main box may further include a transmission chip configured to transmit the audio signal to the display, and the display may further include a reception chip configured to receive the audio signal from the transmission chip.

The main processor may be configured to transmit the audio signal to the transmission chip through an integrated interchip sound (I2S) standard, and acquire the audio signal output by the main processor by connecting a pin outputting the audio signal back to the main processor.

The microphone may be configured to receive a wake-up word for activating a voice function of the display device.

According to another embodiment of the present disclosure, a display device includes a main box including a microphone and a main processor, and a display including an amplifier configured to amplify an audio signal received from the main processor and a speaker configured to convert the amplified audio signal into a sound and output the sound, wherein the main processor further includes a pre-processing amplifier that is identical to the amplifier, and is configured to perform acoustic echo cancellation (AEC) on a pre-processed audio signal that is an output of the pre-processing amplifier with respect to the audio signal.

The pre-processing amplifier may be configured to output a feedback signal that is identical to an output audio signal output by the amplifier.

The main processor may be configured perform communication through a data line (SDA) and a clock line (SCL) for synchronization of communication with the amplifier and the pre-processing amplifier.

The details of one or more embodiments are set forth in the accompanying drawings and the description below. Other features will be apparent from the description and drawings, and from the claims.

BRIEF DESCRIPTION OF THE DRAWINGS

FIG. 2 is a view for describing a display device in which a main box having a main SoC and a display are separated, according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure is, for example, an intelligent display device in which a computer support function is added to a broadcast reception function. An Internet function or the like is added to the video display device that fundamentally has the broadcast reception function. Accordingly, the video display device may include an easy-to-use interface, such as a writing input device, a touch screen, or a spatial remote control device.

With the support of a wired or wireless Internet function, the video display device can connect to the Internet and computers and perform functions such as e-mail, web browsing, banking, or games. In order to perform such various functions, standardized general-purpose OS may be used.

Figure 1:
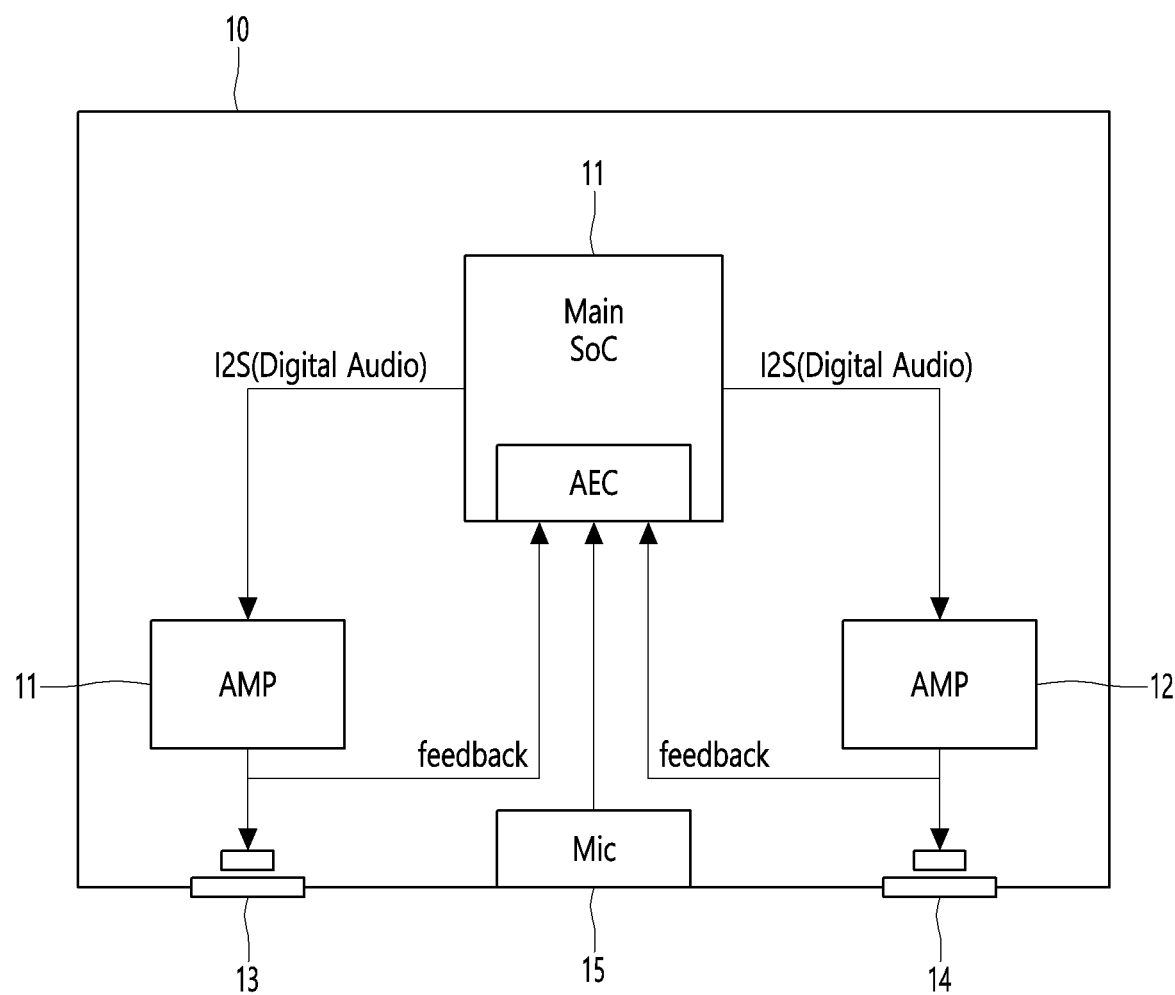
FIG. 1 is a block diagram illustrating a configuration of a display device according to an embodiment of the present disclosure.

FIG. 1 is a view for describing an audio feedback signal processing process of a conventional display device.

Referring to FIG. 1, a conventional display device 10 includes a main System on Chip (SoC) 11, a first amplifier 11, a second amplifier 12, a first speaker 13, a second speaker 14, and a microphone 15.

The main SoC 11 may transmit audio signals to the first amplifier 11 and the second amplifier 12. In this case, the transmitted audio signals may be digital signals.

The main SoC 11 may transmit digital audio signals to the first amplifier 11 and the second amplifier 12 by using an integrated interchip sound (I2S) standard.

A line of the I2S standard may include a line for asynchronous bidirectional transmission, a line for clock signal transmission, and a line for direction signals called a word select.

The first amplifier 11 may amplify a digital audio signal received from the main SoC 11 and transmit the amplified digital audio signal to the first speaker 13.

The second amplifier 12 may amplify a digital audio signal received from the main SoC 11 and transmit the amplified digital audio signal to the second speaker 14.

The main SoC 11 may receive a feedback signal from each of the first amplifier 11 and the second amplifier 12. The feedback signal may be a final signal output from the amplifier to the speaker.

The main SoC 11 may perform acoustic echo cancellation (AEC) based on the feedback signal received from each amplifier.

The AEC may represent an algorithm that cancels echo because the sound output from the speaker is input to the microphone as an echo in a state in which the speaker and the microphone are simultaneously present.

The AEC may be a process of removing the feedback signal, which is received from the amplifier, from the acoustic signal, which is received from the microphone 15.

The first speaker 13 may convert the digital audio signal amplified by the first amplifier 11 into a sound wave and output the sound wave.

The second speaker 14 may convert the digital audio signal amplified by the second amplifier 12 into a sound wave and output the sound wave.

The microphone 15 may receive a voice uttered by a user and convert the received voice into an electrical sound signal.

Since the conventional display device 1 includes the main SoC 11 and the first and second amplifiers 11 and 12, the conventional display device 1 can perform AEC through the feedback signal output from each amplifier.

FIG. 2 is a view for describing a display device in which a main box having a main SoC and a display are separated, according to an embodiment of the present disclosure.

Referring to FIG. 2, a display device 2 may include a display 20 and a main box 30.

The display 20 may display an image. The display 20 may include one or more speakers (not illustrated) that output a sound synchronized with an image.

The main box 30 may be a box including a main SoC that controls the operation of the display 20.

The main box 30 may include a microphone (not illustrated) that receives a voice uttered by a user.

The display 20 and the main box 30 may be connected to each other by wire or wirelessly.

The main box 30 may transmit image data and audio data to the display 20. The display 20 may display an image based on the image data received from the main box 30 and output a sound through the speaker based on the received audio data.

Figure 3:
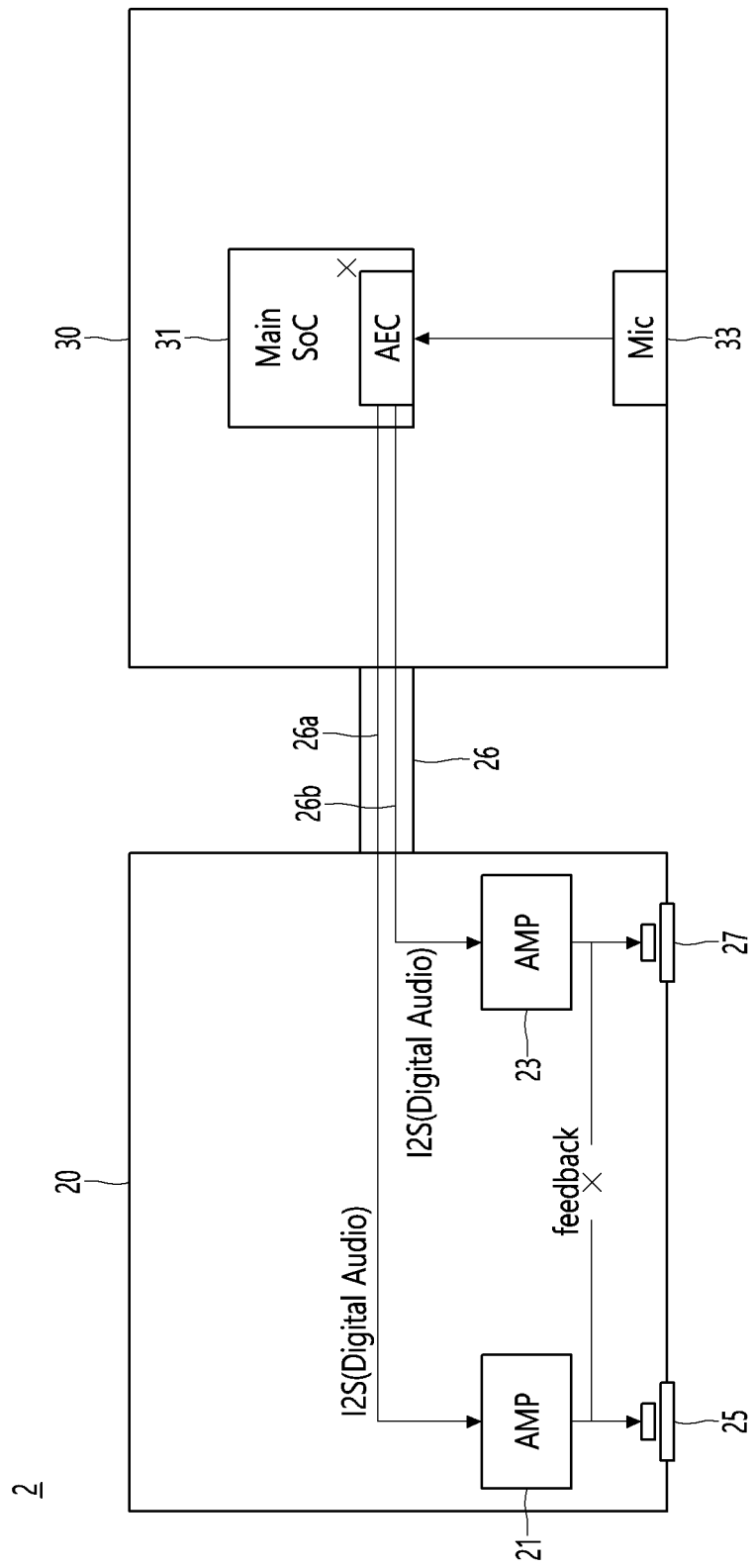
FIGS. 3 and 4 are views illustrating a detailed configuration of a detachable display device.
Figure 4:
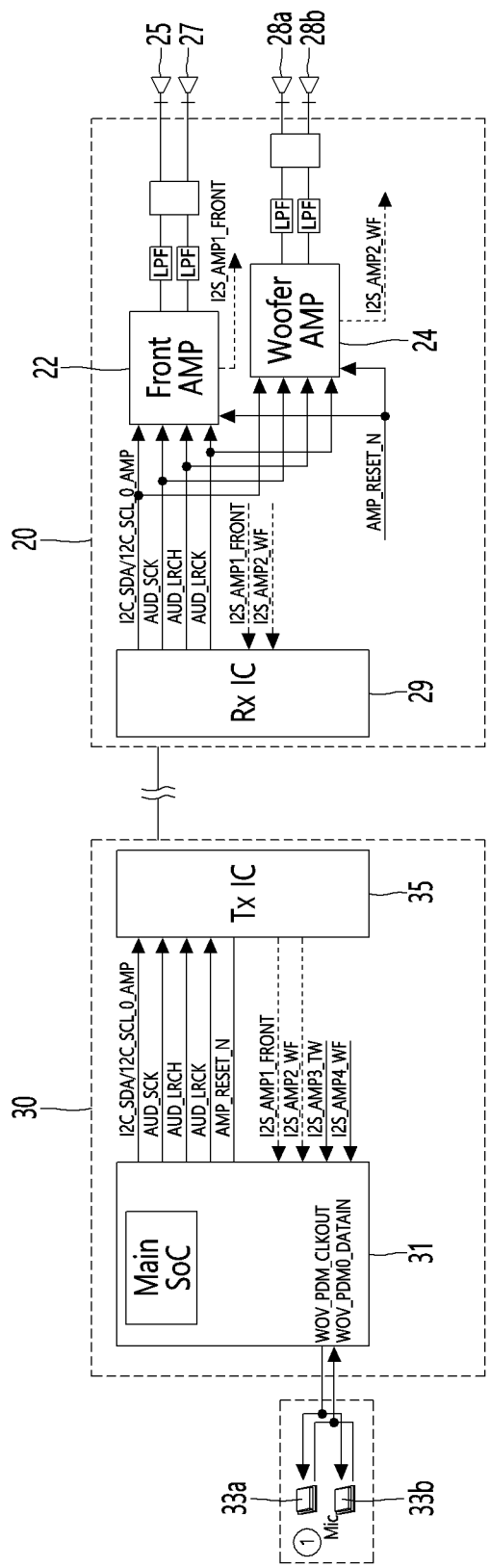

FIGS. 3 and 4 are views illustrating a detailed configuration of a detachable display device.

Referring to FIG. 3, a detachable display device 2 may include a main box 30 and a display 20.

The display 20 may include a display panel (not illustrated) for displaying an image, one or more amplifiers 21 and 23, and one or more speakers 25 and 27.

FIG. 3 illustrates that the display 20 includes two amplifiers and two speakers, but this is only an example. The display 20 may include more amplifiers and more speakers.

The main box 30 may include a main SoC 31 and a microphone 33. FIG. 3 illustrates that the main box 30 includes one microphone, but this is only an example. The main box 30 may include more microphones.

The main SoC 31 may transmit digital audio signals of the I2S standard to the first amplifier 25 and the second amplifier 23 through a connection cable 26.

The main SoC 31 may transmit a first digital audio signal to the first amplifier 21 through a first connection line 26a, and may transmit a second digital audio signal to the second amplifier 23 through a second connection line 26b.

The first amplifier 21 may amplify the first digital audio signal and output the amplified first digital audio signal to the first speaker 25.

The first speaker 25 may convert the amplified first digital audio signal into a first sound and output the first sound.

The second amplifier 23 may amplify the second digital audio signal and output the amplified second digital audio signal to the second speaker 27.

The second speaker 27 may convert the amplified second digital audio signal into a second sound and output the second sound.

As such, in the detachable display device 2, an arrangement position between the main SoC 31 and the amplifier is different. Therefore, the main SoC 31 cannot process the feedback signal output from the amplifier.

That is, when the main SoC 31 receives the feedback signal output from each of the first amplifier 21 and the second amplifier 23 through the connection cable 26, a delay may occur until the feedback signal reaches the main SoC 31. Due to such a delay, the main SoC 31 cannot perform AEC processing through the feedback signal.

FIG. 4 is a view for describing signal processing that is performed inside each of the main box 30 and the display 20.

The main box 30 may include a main SoC 31, a transmission IC (or transmission chip, 35) and two microphones 33a and 33b.

Referring to FIG. 4, the main SoC 31 may transmit a serial data (SDA) and a serial clock (SCL) of the I2C standard to the transmission IC 35.

The transmission chip 35 may transmit data to a reception chip 29 provided in the display 20 by wire or wirelessly.

The SDA of the I2C standard may be audio data.

The SCL of the I2C standard may be a clock signal for synchronization of communication.

The main SoC 31 may transmit AUD_SCK, AUD_LRCH, and AUD_LRCK to the transmission IC 35.

AUD_SCK (continuous serial clock) may be a bit clock. AUD_SCK may be a reference signal for reading a digital audio signal.

AUD_LRCH indicates a word clock and may include information indicating left or right. When a value of AUD_LRCH is low, it may be data for left, and when a value of AUD_LRCH is high, it may be data for right.

AUD_LRCK may indicate serial data (audio data). That is, AUD_LRCK may indicate audio data to be output to an actual speaker.

The main SoC 31 may receive a voice signal from each of the first microphone 33a and the second microphone 33b.

The voice signal may correspond to a wake-up word or an action word uttered by a user.

The wake-up word may be a command for activating the speech recognition function of the display device 2.

The action word may be a command for performing a specific operation of the display device 2 after the speech recognition function is activated. For example, the action word may be a command for channel tuning, menu display, and content search.

The display 20 may include a reception chip 29, a front amplifier 22, a woofer amplifier 24, and a plurality of speakers 25, 27, 28a, and 28b.

The reception chip 29 may receive data from the transmission chip 35 of the main box 30 through wired or wireless communication.

The front amplifier 22 may amplify the digital audio signal received from the reception chip 29 and transmit the amplified digital audio signal to the first speaker 25 and the second speaker 27.

The woofer amplifier 24 may amplify the digital audio signal received from the reception chip 29 and transmit the amplified digital audio signal to the third speaker 28a and the fourth speaker 28b.

The reception chip 29 is an I2S standard and may receive a first feedback signal I2S_AMP1_FRONT from the front amplifier 22 and receive a second feedback signal I2S_AMP2_WF from the woofer amplifier 24.

The first feedback signal I2S_AMP1_FRONT may be an audio signal output from the front amplifier 22, and the second feedback signal I2S_AMP2_WF may be an audio signal output from the woofer amplifier 24.

The reception chip 29 may transmit the first feedback signal I2S_AMP1_FRONT and the second feedback signal I2S_AMP2_WF to the transmission chip 35.

The transmission chip 35 may transmit the first feedback signal I2S_AMP1_FRONT and the second feedback signal I2S_AMP2_WF received from the reception chip 29 to the main SoC 31.

That is, the first feedback signal I2S_AMP1_FRONT and the second feedback signal I2S_AMP2_WF are generated by the display 20 and transmitted to the main box 30.

In this case, a delay occurs due to the time taken for the main SoC 31 to receive the first feedback signal I2S_AMP1_FRONT and the second feedback signal I2S_AMP2_WF. Thus, a problem that cannot perform AEC may occur.

In order to solve this problem, in an embodiment of the present disclosure, the audio signal output from the main SoC 31 may be directly used for processing of the AEC.

Figure 5:
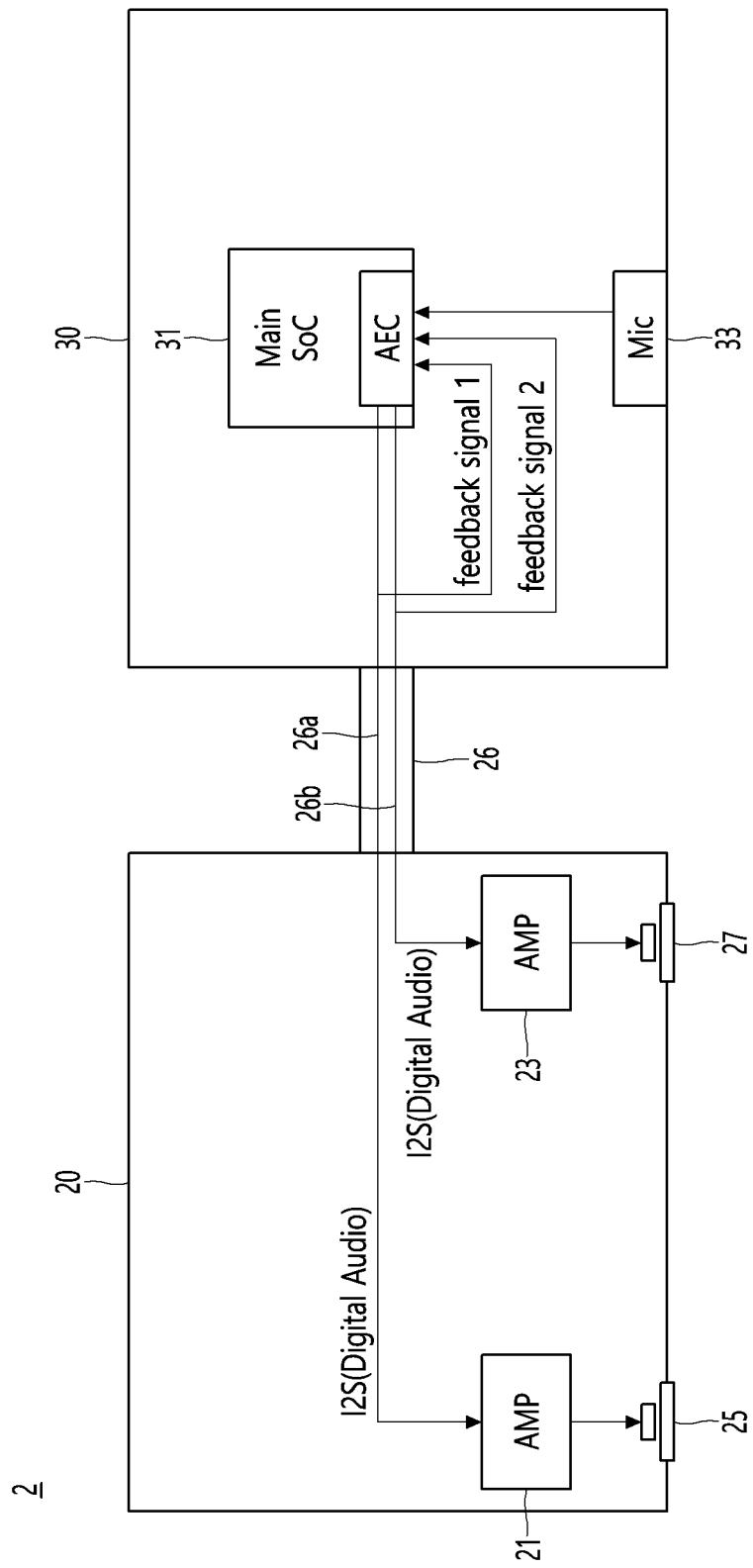
FIGS. 5 and 6 are views for describing a feedback signal processing method of the detachable display device, according to an embodiment of the present disclosure.
Figure 6:
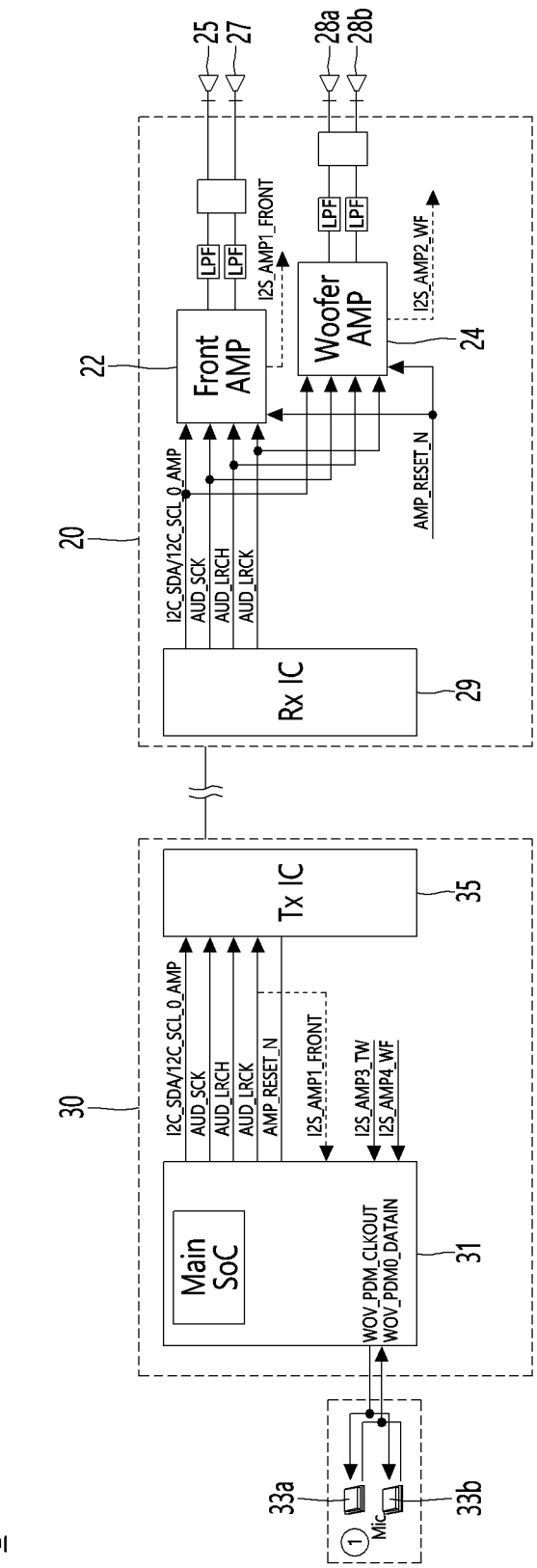

FIGS. 5 and 6 are views for describing a feedback signal processing method of the detachable display device, according to an embodiment of the present disclosure.

The components of the detachable display device 2 of FIG. 5 are the same as the components of the detachable display device 2 of FIG. 3.

However, the difference from FIG. 3 is that the feedback signal output from the first amplifier 21 and the feedback signal output from the second amplifier 23 are not transmitted through the connection cable 26.

The main SoC 31 may transmit the first digital audio signal of the I2S standard to the first amplifier 21 through the first connection line 26a and transmit the second digital audio signal of the I2S standard to the second amplifier 23 through the second connection line 26b.

The first digital audio signal may be identical to the second digital audio signal.

At the same time, the main SoC 31 may acquire the first digital audio signal output by itself as a first feedback signal 1 for AEC processing and acquire the second digital audio signal as a second feedback signal 2.

The main SoC 31 may perform pre-processing on each feedback signal. Specifically, the main SoC 31 may use amplifier information to perform pre-processing on the feedback signal.

The amplifier information may include equalization information and volume information. The equalization information may include a degree of amplification or a degree of attenuation for a specific frequency band of an audio signal.

The volume information may include information about the output magnitude of the audio signal.

That is, the volume information may include a degree to which the magnitude of the audio signal is amplified by the amplifier.

The main SoC 31 may amplify or attenuate a specific frequency band of the feedback signal by using the equalization information. At the same time, the main SoC 31 may adjust the magnitude of the feedback signal by using the volume information.

That is, the feedback signal pre-processing may be a process of amplifying/decreasing the specific frequency band of the feedback signal and adjusting the magnitude of the feedback signal.

More specifically, the feedback signal pre-processing may be a process of reflecting equalization information and volume information to the feedback signal so as to be identical to the audio signal output from the actual speaker.

The main SoC 31 may also include a separate pre-processor for pre-processing the feedback signal.

The main SoC 31 may be referred to as a main processor.

The main SoC 31 may perform AEC by using the pre-processed feedback signal. The main SoC 31 may perform AEC by duplicating the pre-processed feedback signal and removing the duplicated feedback signal.

As such, according to an embodiment of the present disclosure, AEC processing may be efficiently performed in the detachable display device in which the display and the main box are separated. Therefore, it is possible to prevent the recognition performance of the wake-up word from deteriorating.

in FIG. 6, the main SoC 31 may perform pre-processing on the AUD_LRCK (audio signal) output by itself.

The main SoC 31 may acquire AUD_LRCK by connecting a pin outputting AUD_LRCK back to itself.

The main SoC 31 may perform pre-processing on AUD_LRCK by using equalization information and volume information previously held by the main SoC 31.

In order to store the equalization information and the volume information, the main SOC 31 may include a memory (not illustrated). The memory (not illustrated) may be provided separately from the main SoC 31.

That is, according to the embodiment of FIG. 6, the transmission chip 35 does not receive, from the reception chip 29, the feedback signal output from the front amplifier 22 or the feedback signal output from the woofer amplifier 24.

Therefore, a situation in which AEC cannot be normally performed according to the transmission delay of the feedback signal may be prevented.

Figure 7:
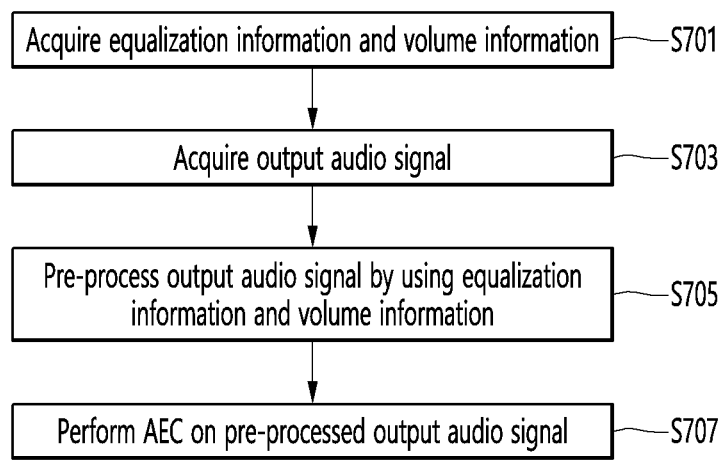
FIG. 7 is a flowchart for describing an operating method of a detachable display device, according to an embodiment of the present disclosure.

FIG. 7 is a flowchart for describing an operating method of a detachable display device, according to an embodiment of the present disclosure.

Referring to FIG. 7, the main SoC 31 acquires equalization information and volume information (S701).

The equalization information and the volume information may be feature information of the final output audio signal output by the amplifier provided in the display 20.

The equalization information may include information indicating a degree of amplification or attenuation for a specific frequency band of the audio signal.

The volume information may include information indicating a degree of amplification for the magnitude of the audio signal.

The main SoC 31 acquires the output audio signal generated by itself (S703).

The main SoC 31 may receive the output audio signal again while transmitting the output audio signal to the transmission chip 35.

The main SoC 31 pre-processes the output audio signal by using the equalization information and the volume information (S705).

The main SoC 31 may amplify or attenuate a specific frequency band of the output audio signal based on the equalization information.

The main SoC 31 may increase or decrease the magnitude of the output audio signal based on the volume information.

The main SoC 31 may pre-process the output audio signal by using the equalization information and the volume information, so that the output audio signal is identical to the final output audio signal output to the speaker by the amplifier.

The main SoC 31 may use the equalization information and the volume information to correct a difference between the value of the output audio signal output by itself and the value of the audio signal output by the amplifier.

The main SoC 31 performs AEC on the pre-processed output audio signal (S707).

The main SoC 31 may acquire the pre-processed output audio signal as the feedback signal and duplicate the feedback signal.

The main SoC 31 may remove the input signal when the same signal as the duplicated feedback signal is input through the microphone 33. This process may be AEC.

Figure 8:
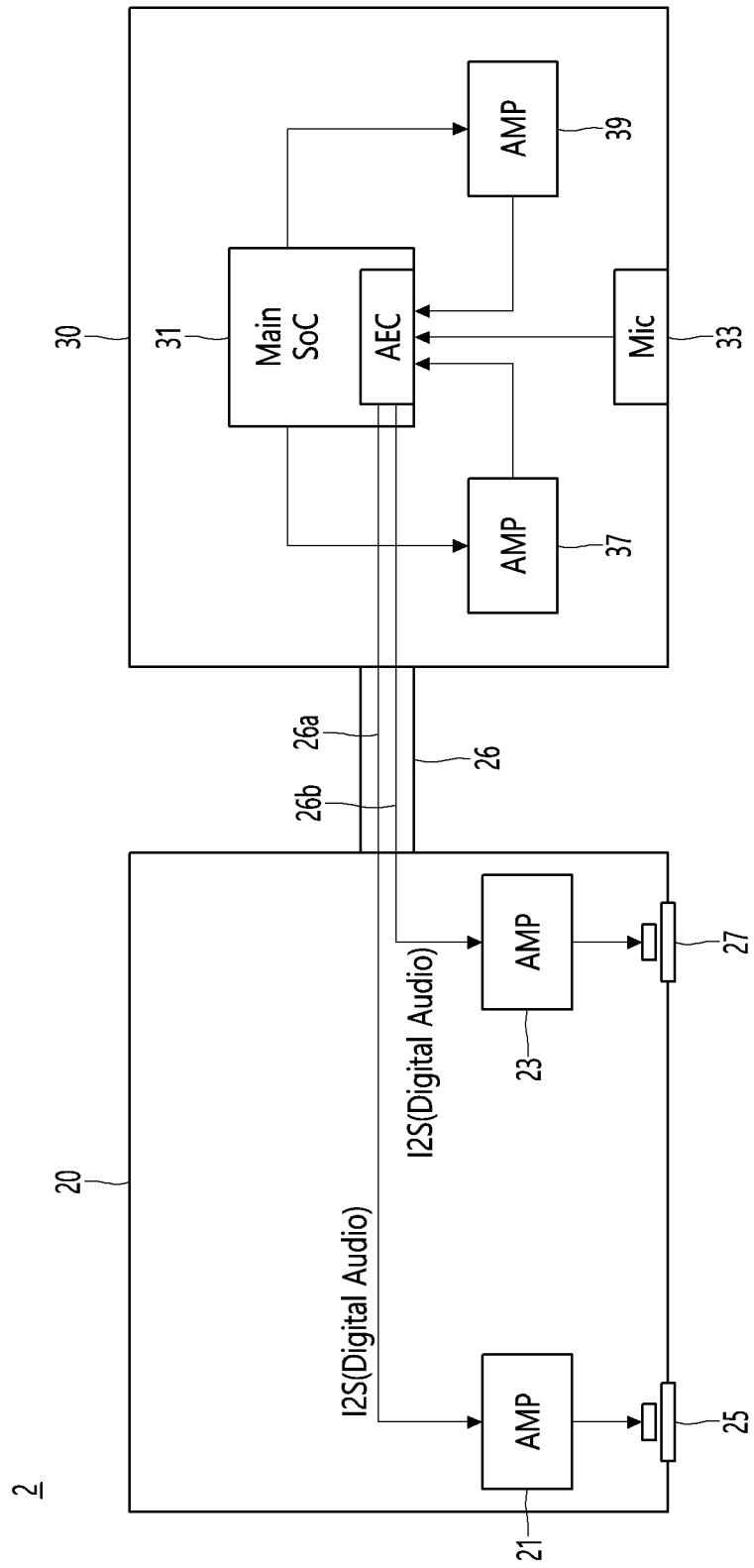
FIG. 8 is a view illustrating a configuration of a detachable display device according to another embodiment of the present disclosure.
Figure 9:
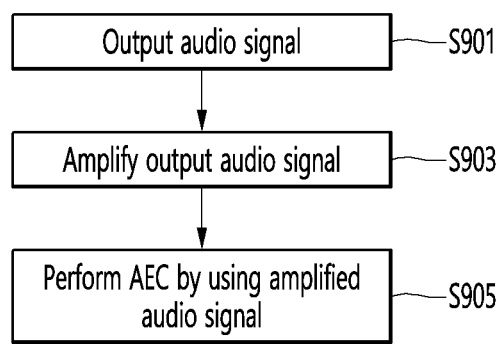
FIG. 9 is a view for describing an AEC processing method according to another embodiment of the present disclosure.

FIG. 8 is a view illustrating a configuration of a detachable display device according to another embodiment of the present disclosure, and FIG. 9 is a view for describing an AEC processing method according to another embodiment of the present disclosure.

Referring to FIG. 8, the main box 30 may include a main SoC 31, a microphone 33, a first pre-processing amplifier 37, and a second pre-processing amplifier 39.

That is, the main box 30 of FIG. 8 may further include the first pre-processing amplifier 37 and the second pre-processing amplifier 39, as compared to the configuration of the main box 30 of FIG. 5.

The first pre-processing amplifier 37 and the second pre-processing amplifier 39 may be used for AEC processing of the audio signal output by the main SoC 31, not for the purpose of outputting the amplified audio signal to the speaker.

The main SoC 31 may control the first pre-processing amplifier 37 and the second pre-processing amplifier 39 through an I2C communication standard.

The I2C communication standard is a standard for performing communication through a line for SDA and two lines for SCL.

The I2C communication standard will be described below.

The first pre-processing amplifier 37 may have the same characteristics as those of the first amplifier 25. That is, equalization information and volume information applied to the first pre-processing amplifier 37 may be the same as equalization information and volume information applied to the first amplifier 21.

Therefore, a first audio signal output from the first pre-processing amplifier 37 may be the same as the signal output from the first amplifier 21 to the first speaker 25.

Similarly, equalization information and volume information applied to the second pre-processing amplifier 39 may be the same as equalization information and volume information applied to the second amplifier 23.

Therefore, a second audio signal output from the second pre-processing amplifier 39 may be the same as the signal output from the second amplifier 23 to the second speaker 27.

The main SoC 31 may duplicate the first audio signal output from the first pre-processing amplifier 37 and the second audio signal output from the second pre-processing amplifier 39.

When the signal input through the microphone 33 is the same as the first audio signal or the second audio signal, the main SoC 31 may remove the input signal.

Referring to FIG. 9, the main SoC 31 generates an audio signal (S901).

The audio signal generated by the main SoC 31 may be a signal that is transmitted to the first amplifier 21 and the second amplifier 23 provided in the display 20 through the connection cable 26.

In addition, the audio signal generated by the main SoC 31 may be a signal that is transmitted to the pre-processing amplifiers 37 and 39.

The main SoC 31 transmits the generated audio signals to the pre-processing amplifiers 37 and 39 (S903).

The pre-processing amplifiers 37 and 39 may amplify and output the audio signal.

The pre-processing amplifiers 37 and 39 may perform pre-processing on the audio signal. The pre-processing amplifiers and 39 include an equalizer, through which a specific frequency band of the audio signal is amplified or attenuated.

The pre-processing amplifiers 37 and 39 may amplify the magnitude of the audio signal by a certain degree.

The pre-processing amplifiers 37 and 39 may transmit, to the main SoC 31, the pre-processed audio signal in which the specific frequency band and the magnitude of the audio signal are adjusted.

The pre-processing amplifiers 37 and 39 may be the same amplifiers as the amplifiers 21 and 23 provided in the display 20.

Therefore, the pre-processed audio signals output from the pre-processing amplifiers 37 and 39 may be the same as the audio signals output from the amplifiers 21 and 23 provided in the display 20.

The main SoC 31 performs AEC by using the pre-processed audio signals output from the pre-processing amplifiers 37 and 39 (S905).

The main SoC 31 may duplicate the same audio signal as the pre-processed audio signal and may remove the input signal when the same signal as the duplicated audio signal is input through the microphone 33. This process may be AEC.

As such, according to an embodiment of the present disclosure, the same signal as the audio signal output by the amplifier provided in the display 20 may be acquired through the preprocessing amplifier provided in the main box 30.

Therefore, AEC may be performed without having to receive the feedback signal from the amplifier provided in the display 20.

Figure 10:
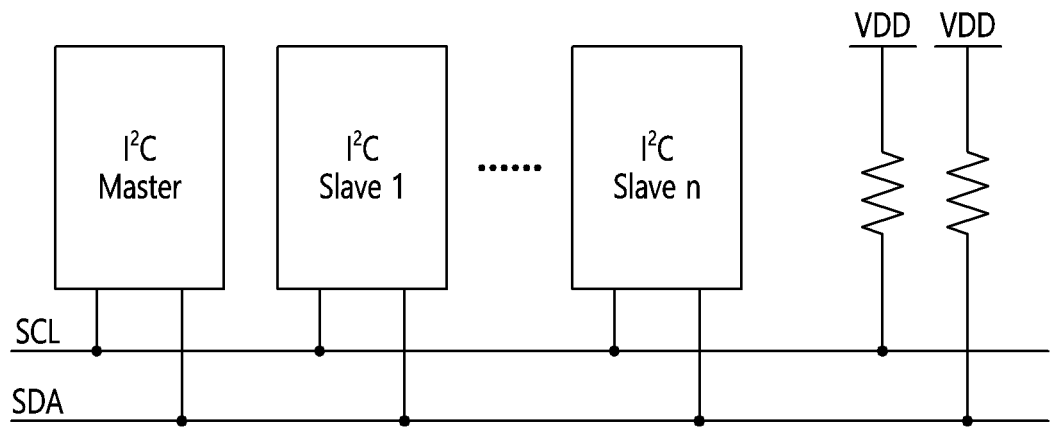
FIG. 10 is a view for describing an I2C communication standard.
Figure 11:
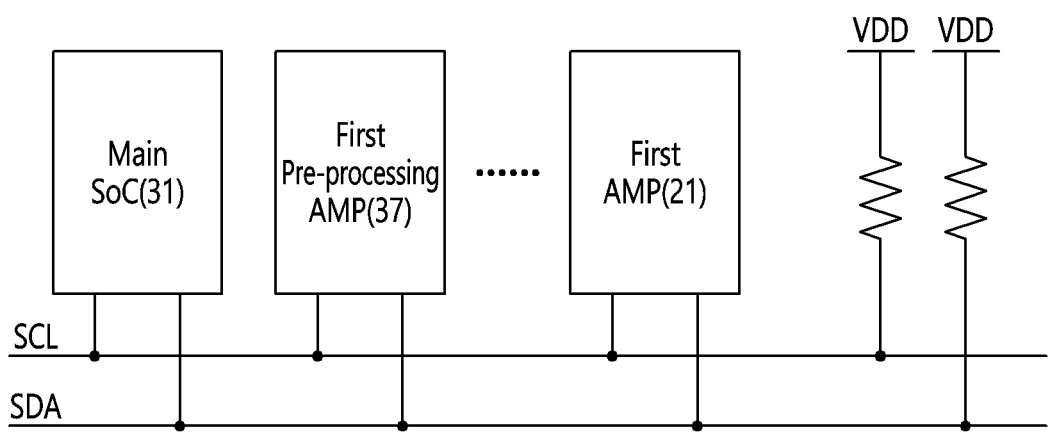
FIG. 11 is a view illustrating a configuration in which a main SoC and pre-processing amplifiers are connected through an I2C communication standard, according to an embodiment of the present disclosure.

FIG. 10 is a view for describing an I2C communication standard, and FIG. 11 is a view illustrating a configuration in which a main SoC and pre-processing amplifiers are connected through an I2C (Inter Integrated Circuit) communication standard, according to an embodiment of the present disclosure.

The I2C communication standard is a standard for communication between a master and a slave and includes two lines, SCL and SDA, which are bidirectional open drain lines.

SCL is a clock line for synchronizing communications, and SDA is a data line. The master may output a clock for synchronization to the SCL, and the slave may output or receive data through the SDA in synchronization with the clock output to the SCL.

Since data is exchanged only through the SDA, the I2C communication standard can perform only half duplex communication.

Since both the SCL and the SDA are open drain, a pull-up resistor is connected to each line.

Since the master and all slaves share the SCL and SDA, the master may identify the slaves through addresses of the slaves so as to individually designate the slaves.

In the embodiment of FIG. 8, the main SoC 31 becomes a master, and the first pre-processing amplifier 37 and the first amplifier 21 provided in the display 20 become slaves.

That is, referring to FIG. 11, the main SoC 31 and the first pre-processing amplifier 37 are connected through the SCL and the SDA, and the main SoC 31 and the first amplifier 21 are also connected through the SCL and the SDA.

That is, the first amplifier 21 and the first pre-processing amplifier 37 may be connected through the same SCL and SDA.

Similarly, the second amplifier 23 and the second pre-processing amplifier 39 may also be connected through the same SCL and SDA.

Hereinafter, the embodiment applied between the first pre-processing amplifier 37 and the first amplifier 21 may also be applied between the second pre-processing amplifier 39 and the second amplifier 23.

The main SoC 31 may transmit the digital audio signal of the I2S standard to the first pre-processing amplifier 37 and the first amplifier 21.

The first pre-processing amplifier 37 and the first amplifier 21 may be the same amplifier. However, the first pre-processing amplifier 37 may be an amplifier used to extract only the feedback signal, not the speaker output purpose.

Since the first amplifier 21 and the first pre-processing amplifier 37 are connected to the main SoC 31 through the same SCL and SDA, a collision may occur. Therefore, the following I2C control method may be used.

In an embodiment, the main SoC 31 may transmit different addresses to the amplifiers so as to distinguish the first pre-processing amplifier 37 and the first amplifier 21 through the SCL and the SDA.

In another embodiment, the main SoC 31 may assign the same address to the first amplifier 21 and the first pre-processing amplifier 37. In this case, the main SoC 31 may receive ACK from the first amplifier 21 and the first pre-processing amplifier 37. After the main SoC 31 receives ACK twice, the main SoC 31 may perform AEC on the pre-processed audio signal received from the first pre-processing amplifier 37.

In another embodiment, either of the first amplifier 21 and the first pre-processing amplifier 37 may be designed not to transmit ACK to the main SoC 31.

According to an embodiment of the present disclosure, acoustic echo cancellation (AEC) can be effectively performed even in the detachable display device.

Therefore, speech recognition performance, such as recognition of wake-up word, can be greatly improved.

According to an embodiment of the present disclosure, the above-described method may be embodied as a processor readable code on a medium in which a program is recorded. Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. A display system comprising:
   a main box comprising a microphone and a processor configured to output an audio signal; and
   a display comprising an amplifier configured to amplify the audio signal received from the processor and a speaker configured to output sound of the amplified audio signal, wherein the processor is configured to:
   perform acoustic echo cancellation (AEC) on the audio signal based on the audio signal output by the processor, equalization information of the audio signal, and volume information of the audio signal, wherein the equalization information comprises a degree of amplification or a degree of attenuation for a specific frequency band of the audio signal, and wherein the volume information comprises information about an output magnitude of the audio signal.

2. The display system of claim 1, wherein the equalization information and the volume information correspond to information about the amplifier, and wherein the processor is further configured to store the equalization information and the volume information.

3. The system of claim 1, wherein the processor is further configured to:
amplify or attenuate the specific frequency band of the audio signal based on the equalization information; and
adjust the output magnitude of the audio signal based on the volume information.

4. The display system of claim 3, wherein the processor is further configured to:
duplicate the audio signal after the specific frequency band is amplified or attenuated and the output magnitude is adjusted; and
remove an input audio signal based on the duplicated amplified audio signal corresponding to the input audio signal obtained through the microphone.

5. The display system of claim 1, wherein the main box and the display are configured to communicate by a wire or wirelessly.

6. The display system of claim 1, wherein the main box further comprises a transmission chip configured to transmit the audio signal to the display, and wherein the display further comprises a reception chip configured to receive the audio signal from the transmission chip.

7. The display system of claim 6, wherein the processor is further configured to:
transmit the amplified audio signal to the transmission chip through an integrated interchip sound (I2S) standard; and
acquire the audio signal output by the processor based on connecting a pin outputting the acquired audio signal back to the processor.

8. The display system of claim 1, wherein the microphone is configured to obtain a wake-up word for activating a voice function of the display system.

9. A method of a display system comprising a main box and a display, the method comprising:
transmitting, by the main box, an audio signal to the display;
amplifying, by an amplifier included in the display, the audio signal received from the main box;
outputting, by a speaker included in the display, sound of the amplified audio signal; and
performing, by the main box, acoustic echo cancellation (AEC) on the audio signal based on the audio signal output by the main box, equalization information of the audio signal, and volume information of the audio signal, wherein the equalization information comprises a degree of amplification or a degree of attenuation for a specific frequency band of the audio signal, and wherein the volume information comprises information about an output magnitude of the audio signal.

10. The method of claim 9, wherein the equalization information and the volume information correspond to information about the amplifier, and wherein the method further comprises storing the equalization information and the volume information.

11. The method of claim 9, wherein the performing of the acoustic echo cancellation (AEC) further comprises:
amplifying or attenuating the specific frequency band of the amplified audio signal based on the equalization information; and
adjusting an output magnitude of the amplified audio signal based on the volume information.

12. The method of claim 11, wherein the performing of the acoustic echo cancellation (AEC) further comprises:
duplicating the audio signal after the specific frequency band is amplified or attenuated and the output magnitude is adjusted; and
removing an input audio signal based on the duplicated audio signal corresponding to the input audio signal obtained through a microphone.

13. The method of claim 12, wherein the main box and the display are configured to communicate by a wire or wirelessly.

* * * * *